(12) United States Patent
Li (10) Patent No.: US 8,142,230 B2
(45) Date of Patent: Mar. 27, 2012

(54) EARPHONE ASSEMBLY AND ELECTRONIC DEVICE USING THE SAME

(75) Inventor: Jian-Hui Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 94 days.

(21) Appl. No.: 12/826,811

(22) Filed: Jun. 30, 2010

(65) Prior Publication Data
US 2011/0171860 A1    Jul. 14, 2011

(30) Foreign Application Priority Data
Jan. 9, 2010  (CN) .......................... 2010 1 0300152

(51) Int. Cl.
*H01R 25/00* (2006.01)

(52) U.S. Cl. ..................................... 439/638; 439/669

(58) Field of Classification Search ............... 439/894, 439/660, 669, 668, 638, 218, 653, 131, 147
See application file for complete search history.

(56) References Cited

U.S. PATENT DOCUMENTS

| | | | | |
|---|---|---|---|---|
| 6,203,344 B1 * | 3/2001 | Ito | ................ | 439/218 |
| 7,699,664 B2 * | 4/2010 | Kim et al. | ................ | 439/668 |
| 7,833,029 B2 * | 11/2010 | Choi et al. | ................ | 439/135 |
| 7,909,651 B2 * | 3/2011 | Kim et al. | ................ | 439/638 |
| 2010/0151719 A1 * | 6/2010 | Kung et al. | ................ | 439/358 |

* cited by examiner

*Primary Examiner* — Edwin A. Leon
(74) *Attorney, Agent, or Firm* — Altis Law Group, Inc.

(57) ABSTRACT

An earphone assembly includes a plug, a switch element; and a USB connector. The USB connector is rotatably assembled to the switch element and electronically connects the plug. The invention further discloses an electronic device including an earphone assembly and a plug seat. The earphone assembly includes a plug, a switch element, and a USB connector. The USB connector is rotatably assembled to the switch element and electronically connects the plug. The plug seat is assembled in the electronic device for receiving the plug.

19 Claims, 10 Drawing Sheets

EARPHONE ASSEMBLY AND ELECTRONIC DEVICE USING THE SAME

BACKGROUND

1. Technical Field

The present disclosure generally relates to earphone assemblies, and particularly, to an earphone assembly for use in an electronic device.

2. Description of Related Art

Varieties of electronic devices are widely used, such as mobile phones, MP3s, or MP4s players. Users can use an earphone assembly to listen to radio and music from the electronic devices. After the electronic devices are used for a period of time, electric power of the electronic devices is exhausted and the electronic devices need to be charged by a charger. So when users travel, they have to take the earphone and the charger. It can be inconvenient to carry both these items.

Therefore, there is a room for improvement within the art.

BRIEF DESCRIPTION OF THE DRAWINGS

Many aspects of the earphone assembly and electronic device using the same can be better understood with reference to the following drawings. The components in the drawings are not necessarily to scale, the emphasis instead being placed upon clearly illustrating the earphone assembly and electronic device using the same. Moreover, in the drawings, like reference numerals designate corresponding parts throughout the several views.

DETAILED DESCRIPTION

Figure 1:
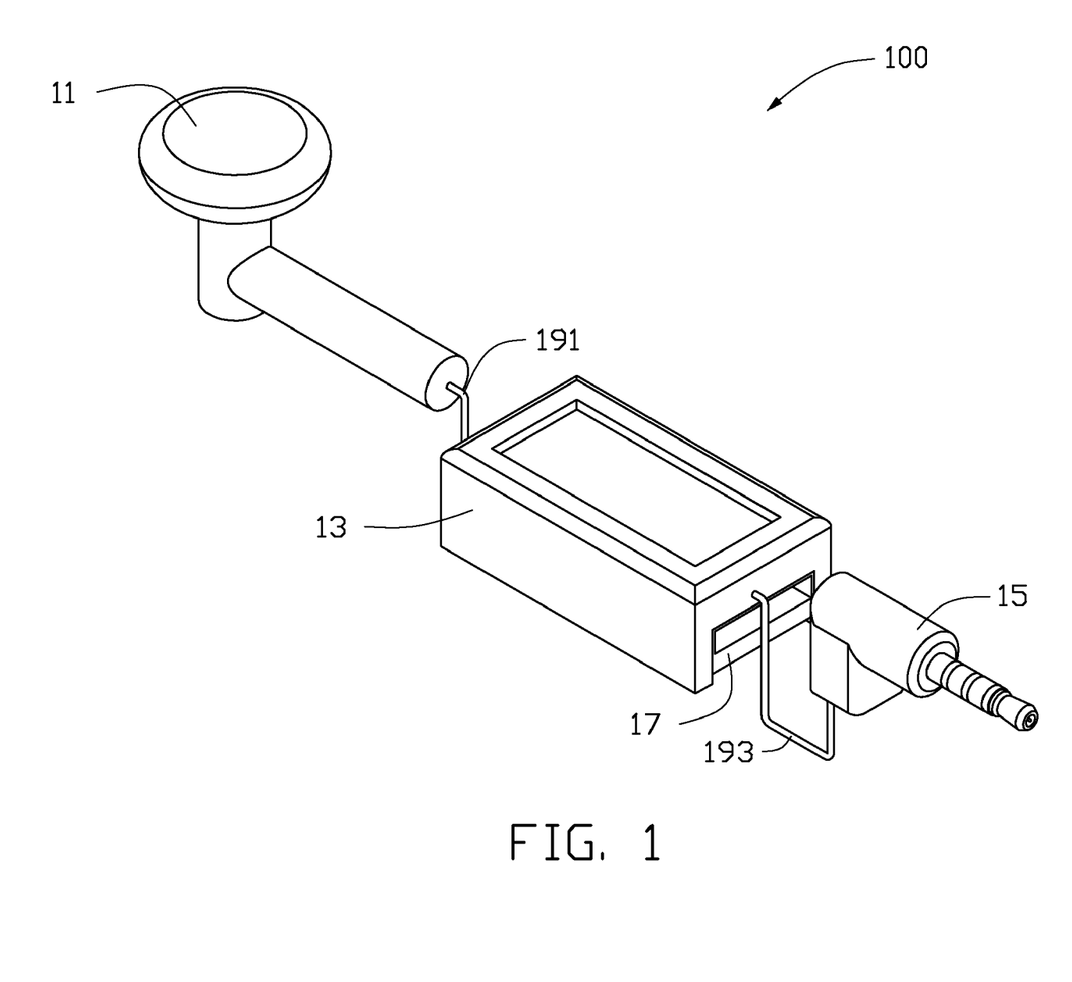
FIG. 1 is an isometric view of a first earphone assembly.
Figure 2:
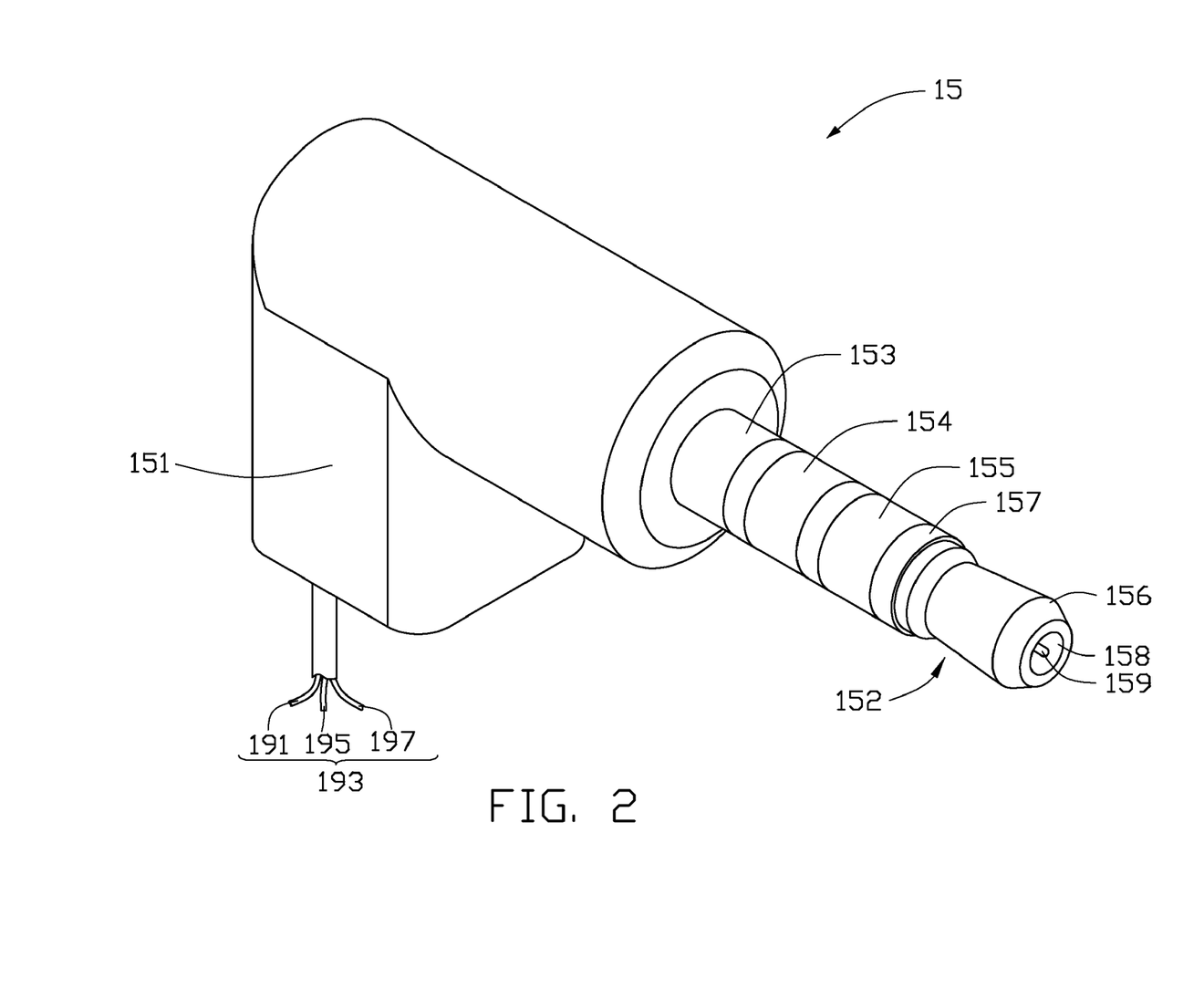
FIG. 2 is an enlarged, isometric view of a plug shown in FIG. 1.

FIGS. 1 and 2 show an exemplary embodiment of an earphone assembly 100 used in an electronic device, such as mobile phones, or personal digital assistants. The earphone assembly 100 includes an earpiece 11, a switch element 13, a plug 15, a USB connector 17, an audio wire 191, and a conduit 193. The conduit 193 includes the audio wire 191, a power wire 195, and a ground wire 197. The earpiece 11 electronically connects to the plug 15 by the audio wire 191. The USB connector 17 rotatably connects the switch element 13, as will be described below. The USB connector 17 can connect a USB interface of a computer or a charger for transmitting electrical signal.

The plug 15 includes a main body 151 and a connecting portion 152 extending from the main body 151. The connecting portion 152 includes a first contact portion 153, a second contact portion 154, a third contact portion 155 and a fourth contact portion 156. Each contact portion is made of a conducting material, and an insulating layer 157 is disposed between each adjacent contact portion. In the exemplary embodiment, the first contact portion 153 functions as a grounding point, the second contact portion 154 functions as a microphone point, the third contact portion 155 functions as a left volume channel point, and the fourth contact portion 156 functions as a right volume channel point. A free end of the connecting portion 152 defines a receiving groove 158, and a probe 159 made of a conducting material is disposed in the receiving groove 158.

Figure 3:
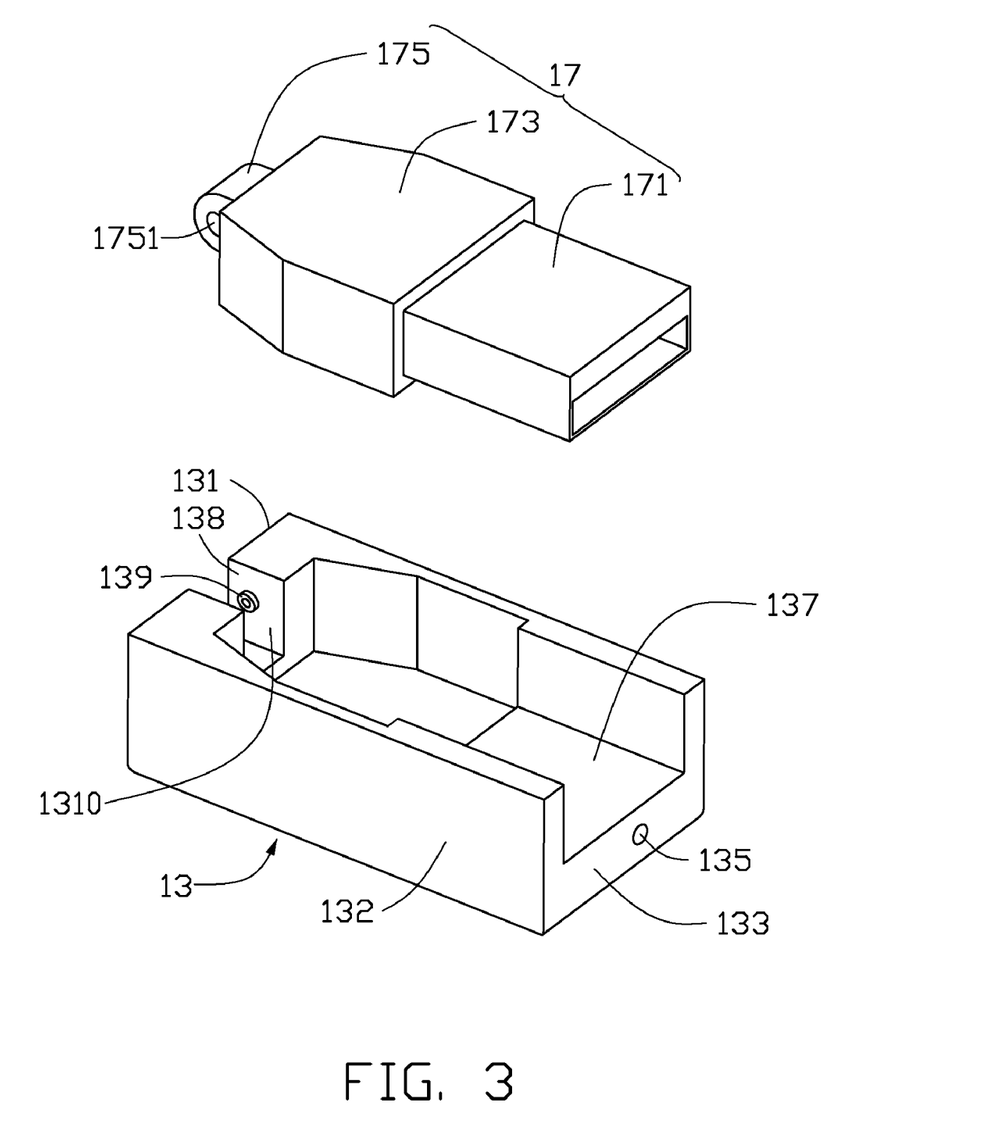
FIG. 3 is an enlarged, isometric view of a USB connector and a switch element shown in FIG. 1, but shown from another angle.
Figure 5:
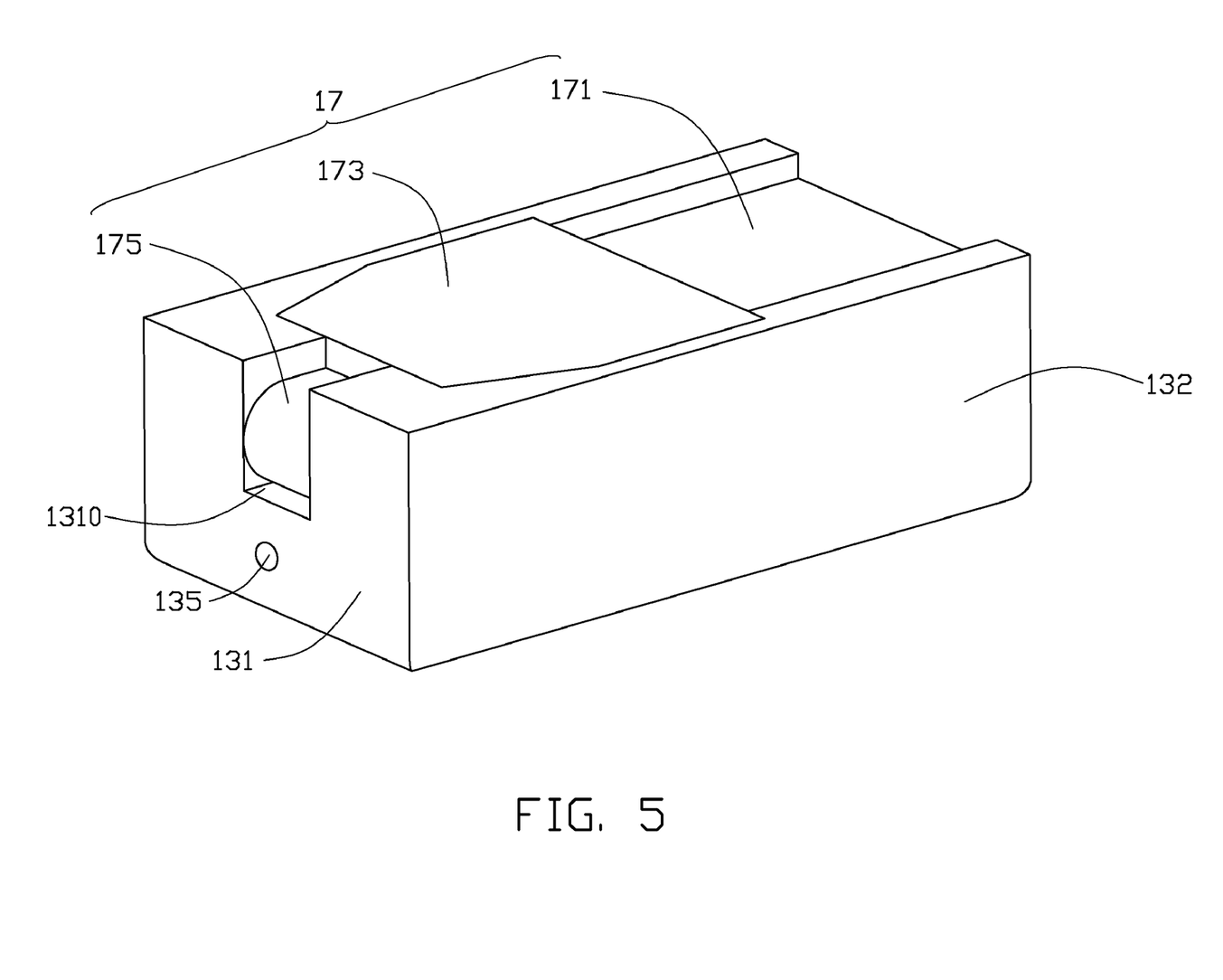
FIG. 5 is an assembled, isometric view of the USB connector and the switch element shown in FIG. 3.

Referring to FIGS. 3 and 5, the switch element 13 includes a first sidewall 131, two second sidewalls 132 facing each other, and a bottom wall 133. The first sidewall 131 connects the second sidewalls 132. The first sidewall 131 and the two second sidewalls 132 perpendicularly extend from the bottom wall 133, and cooperatively define a receiving chamber 137 for receiving the USB connector 17. The first sidewall 131 defines a notch 1310 by forming two ends 138 facing each other. A post 139 extends from each end 138. The bottom wall 133 defines a first through hole 135 along a longitudinal direction thereof. The audio wire 191 and the conduit 193 can pass through the first through hole 135.

Figure 4:
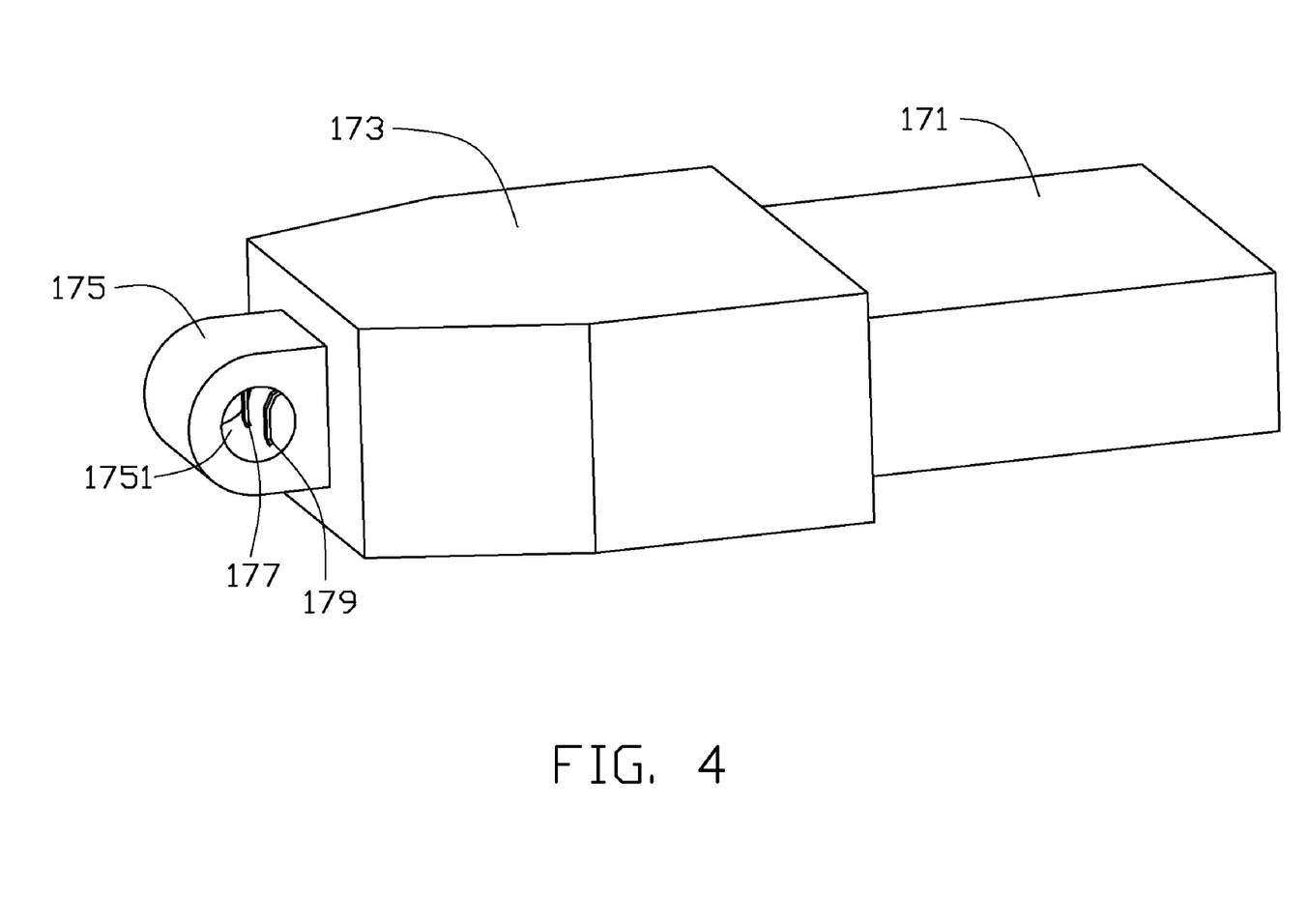
FIG. 4 is an enlarged, isometric view of the USB connector shown in FIG. 3.

The USB connector 17 includes a connecting end 171, a main portion 173, and a shaft 175. The connecting end 171 and the shaft 175 extend from two ends of the main portion 173. The connecting end 171 can be inserted into the USB interface of the computer or the charger. The shaft 175 defines a connecting hole 1751 passing therethrough. Each post 139 can match in the connecting hole 1751, thus, the USB connector 17 can rotate about the switch element 13. A power supply terminal 177 and a ground terminal 179 are positioned on an inner peripheral wall of the connecting hole 1751. The power supply terminal 177 and the ground terminal 179 respectively electronically connect the power wire 195 and the ground wire 197.

In assembly, each post 139 is inserted into the connecting hole 1751. Thus, the USB connector 17 is rotatably received in the receiving chamber 137. The audio wire 191 passes through the first through hole 135 and electronically connects the earpiece 11 to the plug 15. The power wire 195 passes through the first through hole 135 and electronically connects the probe 159 to the power supply terminal 177. The ground wire 197 passes through the first through hole 135 and electronically connects the first contact portion 153 to the ground terminal 179.

Figure 6:
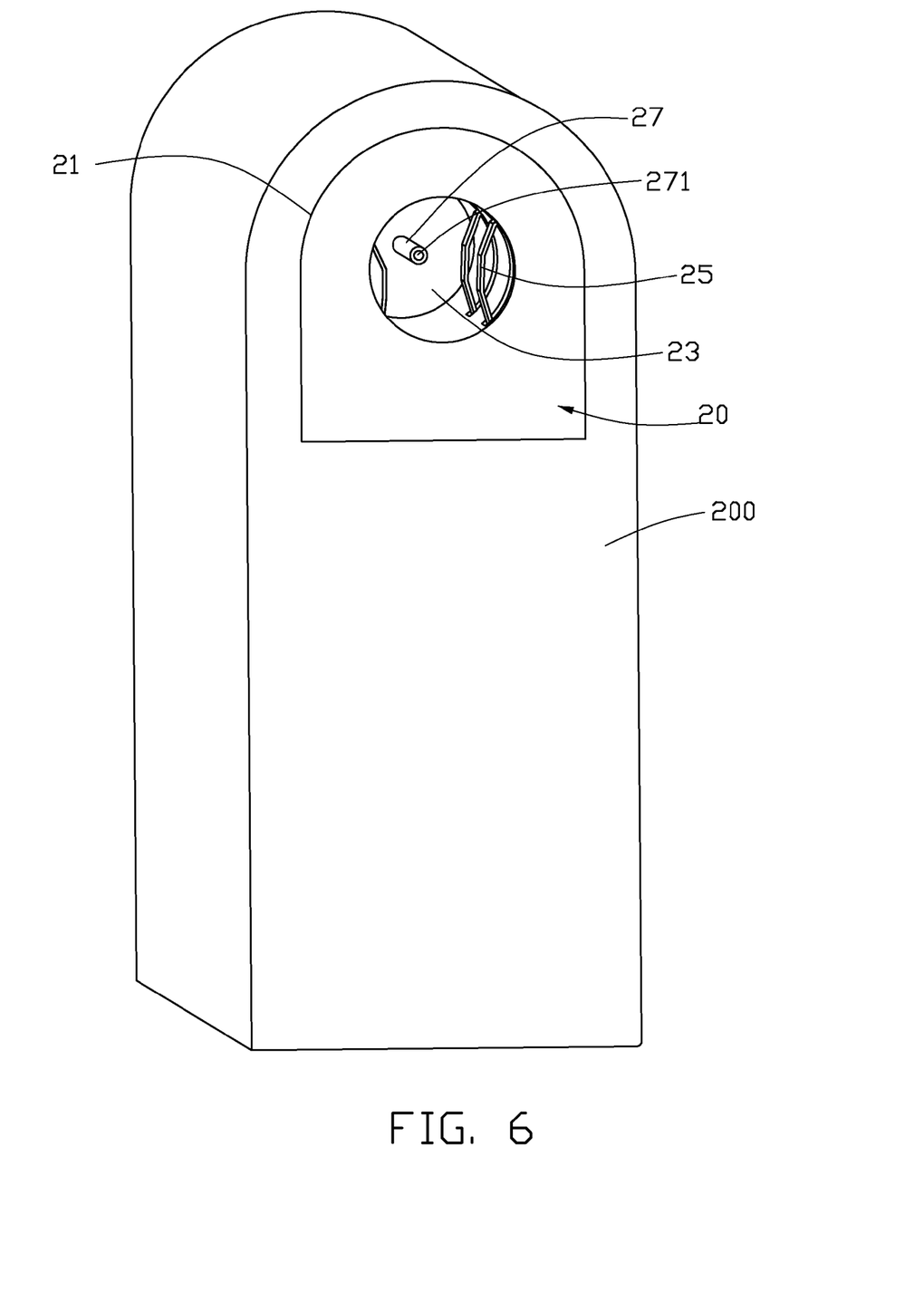
FIG. 6 is an isometric view of an electronic device and a phone jack.

FIG. 6 shows a plug seat 20 is assembled in an electronic device 200 for matching with the earphone assembly 100. The plug seat 20 includes a fixing seat 21 defining a jack socket 23 for receiving and electronically connecting the connecting portion 152. Two pairs of pins 25 are disposed on an inner peripheral wall of the jack socket 23. Each pair of pins 25 is staggered and opposes each other. The pins 25 are corresponding to the first contact portion 153, the second contact portion 154, the third contact portion 155, and the fourth contact portion 156. A conducting post 27 extends from a bottom of the jack socket 23, and defines a receiving hole 271 for receiving the probe 159. Each of the pins 25 electronically connects electronic elements (not shown) of the electronic device 200. The conducting post 27 electronically connects a charging circuit (not shown).

Figure 7:
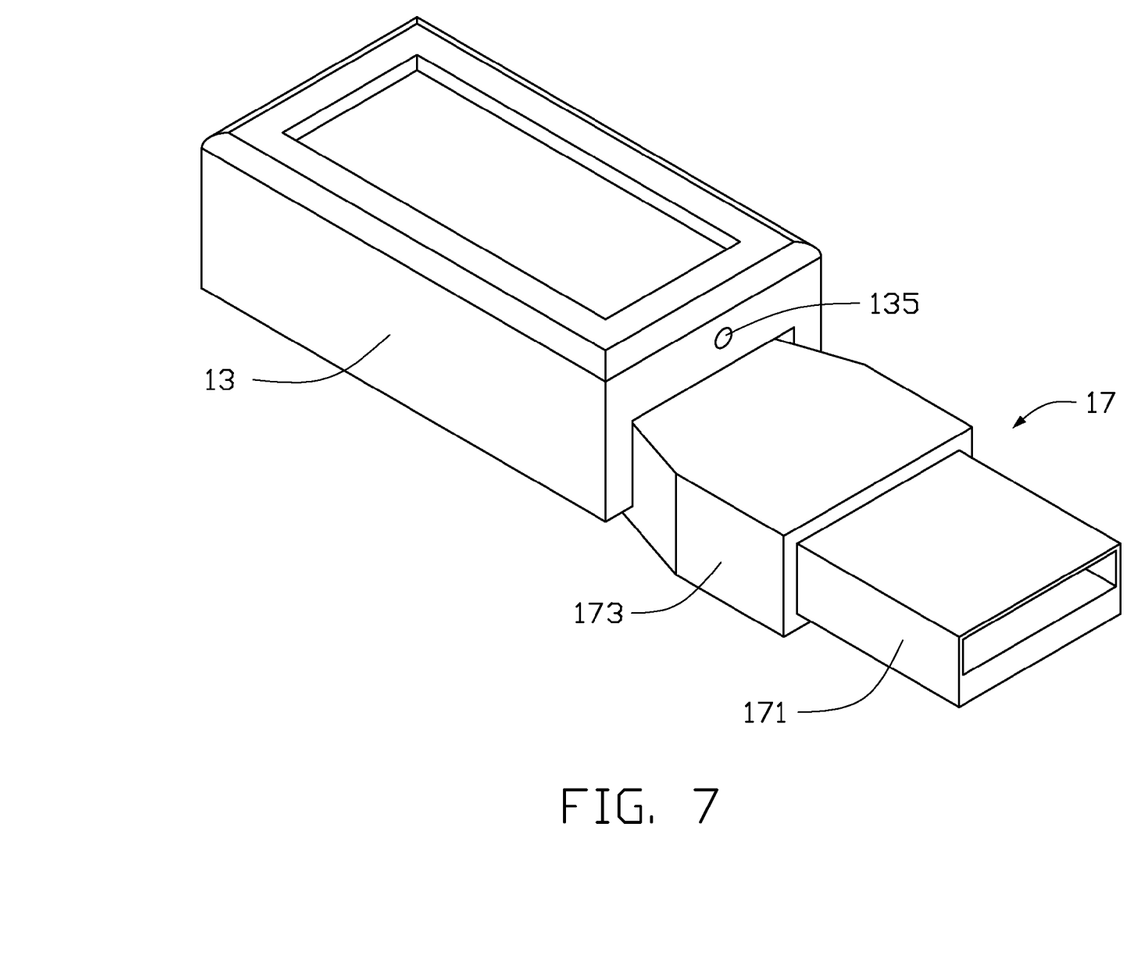
FIG. 7 is an isometric view of the switch element and the USB connector in a state of use shown in FIG. 3.

Referring to FIG. 7, when the electronic device 200 is to be charged, the USB connector 17 is rotated around the post 139 and detached from the receiving chamber 137. The USB connector 17 is inserted into the USB interface of the computer or the charger. The plug 15 is inserted into the plug seat 20. Thus, the electronic device 200 is charged.

Figure 8:
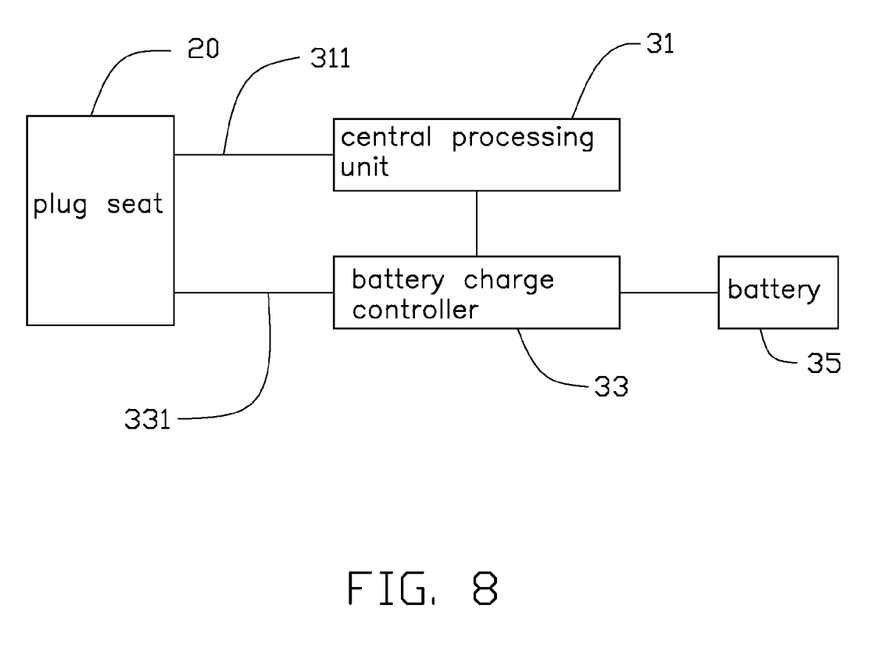
FIG. 8 is a block circuit diagram view of the electronic device.

FIG. 8 shows the electronic device 200 including a central processing unit (CPU) 31, a battery charge controller 33, and a battery 35. The pins 25 electronically connect the central processing unit 31 by an audio signal line 311. The conducting post 27 electronically connects the battery charge controller 33 via a power line 331. The battery charge controller 33 electronically connects the battery 35 and the central processing unit 31. When the plug 15 is inserted into the plug seat 20, the battery charge controller 33 detects voltage of the conducting post 27, if the voltage is equal to or higher than 5 volts, the battery 35 is charged. If the voltage is lower than 5 volts, the battery charge controller 33 sends a controlling signal to the central processing unit 31 to prompt an earphone function.

Figure 9:
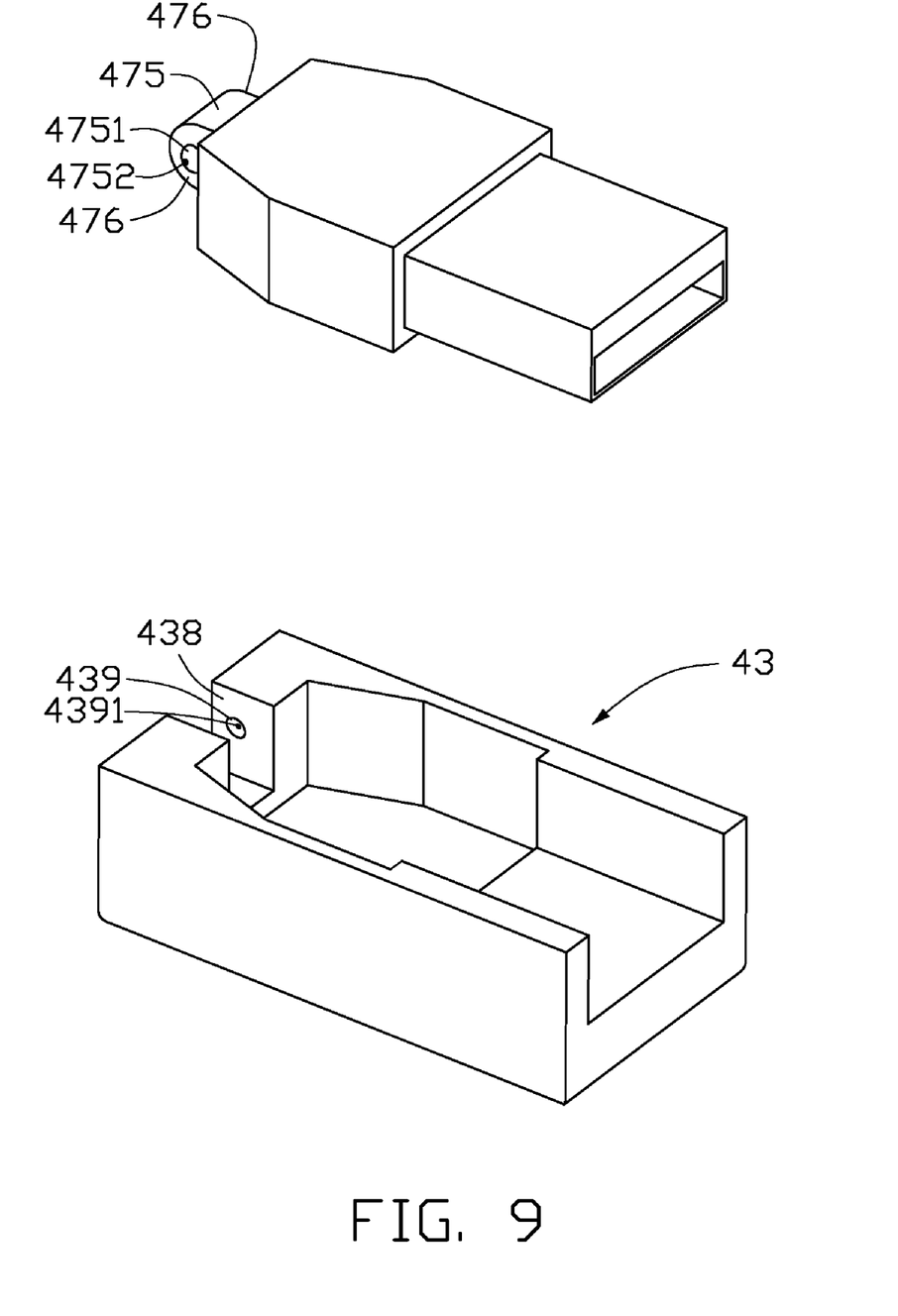
FIG. 9 is a disassembled, isometric view of a second USB connector and a switch element.

FIG. 9 shows a second embodiment of an earphone assembly similar to the earphone assembly 100, but the differences are: each of two opposing ends 438 define a rotating groove 439 defining a second through hole 4391. The shaft 475 includes two opposite side ends 476, and a protrusion 4751 extends from each of the side ends 476 for rotatably receiving in the rotating groove 439. Each protrusion 4751 defines a third through hole 4752. The power wire 195 and the ground wire 197 can pass through the second through hole 4391 and the third through hole 4752.

Figure 10:
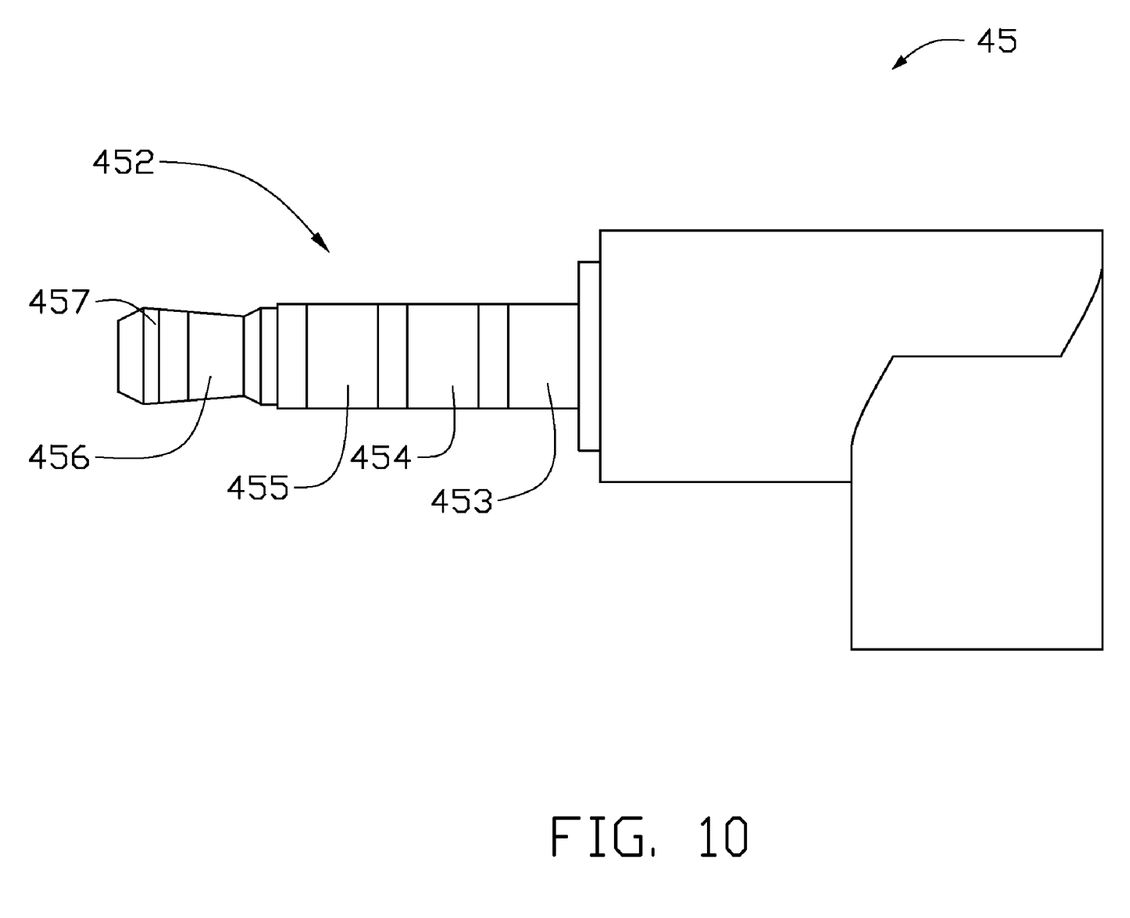
FIG. 10 is an enlarged, side view of a third plug.

Referring FIG. 10, a third exemplary embodiment of an earphone assembly similar to the earphone assembly 100, but the differences are: the connecting portion 452 includes a first contact portion 453, a second contact portion 454, a third contact portion 455, a fourth contact portion 456, and a fifth contact portion 457 orderly disposed thereon. In one embodiment, the first contact portion 453 is a ground point, the second contact portion 454 is a microphone point, the third contact portion 455 is a left channel point, the fourth contact portion 456 is a right channel point, and the fifth contact portion 457 is a power supply point. The power supply terminal 177 electronically connects the fifth contact portion 457 via the power wire 195. Correspondingly, a fifth clip 457 is attached on the inner peripheral wall of the jack socket 23.

It is noteworthy that the conducting post 27 can be omitted. The jack socket 23 directly defines a receiving portion for receiving the probe 159.

The earphone assembly 100 is combined with the USB connector 17, the earphone assembly 100 is not only used to listen to radio and music, but also used as a charger for charging. Therefore, earphone assembly 100 is convenient to carry with and achieve two different functions.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An earphone assembly, comprising:
   an earpiece;
   a plug;
   a switch element defining a receiving chamber, the switch element electronically connected to the earpiece and the plug; and
   a USB connector rotatably assembled to the receiving chamber of the switch element and electronically connected to the switch element;
   wherein the plug is inserted into a plug seat of an electronic device, the plug transmits an audio signal of the electronic device to the earpiece in an earphone mode of the earphone assembly; when the USB connector is rotated out of the switch element, and is inserted into a USB interface of a charging device configured for providing power, the power is transmitted from the charging device to the electronic device through the plug in a power mode of the earphone assembly.

2. The earphone assembly as claimed in claim 1, wherein an audio wire is electronically connected to the earpiece and one end of the switch element, a conduit is electronically connected to the plug and another end of the switch element.

3. The earphone assembly as claimed in claim 2, wherein the USB connector comprises a power supply terminal, the plug comprises a main body and a connecting portion extending from the main body, the connecting portion comprises a contact portion, the conduit includes a power wire electronically connected to the power supply terminal and the contact portion.

4. The earphone assembly as claimed in claim 3, wherein a free end of the connecting portion defines a receiving groove, and a probe is disposed in the receiving groove, the probe is electronically connected to the power wire.

5. The earphone assembly as claimed in claim 1, wherein the USB connector comprises a connecting end, a main portion, and a shaft, the connecting end and the shaft extend from two ends of the main portion, and the shaft is rotatably connected to the switch element.

6. The earphone assembly as claimed in claim 5, wherein the shaft defines a connecting hole passing therethrough, the switch element defines a notch by forming two ends facing each other, a post extends from each of the ends; each post rotatably matching in the connecting hole.

7. The earphone assembly as claimed in claim 6, wherein a power supply terminal and a grounding terminal are positioned on an inner peripheral wall of the connecting hole, the earphone assembly further comprising a power wire and a ground wire, the power supply terminal and the grounding terminal are electronically connected to the plug by the power wire and the ground wire.

8. The earphone assembly as claimed in claim 7, wherein the switch element defines a first through hole, the power wire and the ground wire pass through the first through hole and electronically connects the plug to the power supply terminal and the grounding terminal.

9. The earphone assembly as claimed in claim 5, wherein the shaft comprises two opposite side ends, a protrusion extends from each of the side ends; the switch element defines a notch by forming two facing ends facing each other, each of the facing ends defines a rotating groove; each protrusion rotatably matching in the rotating groove.

10. An electronic device, comprising:
    an earphone assembly, comprising an earpiece, a plug, a switch element electronically connected to the earpiece and the plug, and a USB connector rotatably assembled to the switch element and electronically connected to the switch element; and
    a plug seat assembled in the electronic device for receiving the plug;
    wherein the plug is inserted into the plug seat, the plug transmits an audio signal of the electronic device to the earpiece in an earphone mode of the earphone assembly; when the USB connector is rotated out of the switch element, and is inserted into a USB interface of a charging device configured for providing power, the power is transmitted from the charging device to the electronic device through the plug in a power mode of the earphone assembly.

11. The electronic device as claimed in claim 10, wherein an audio wire passes through the switch element to electronically connect the earpiece to the plug.

12. The electronic device as claimed in claim 11, wherein the USB connector comprises a power supply terminal, the plug comprises a main body and a connecting portion extending from the main body, the connecting portion comprises a contact portion electronically connected to the power supply terminal; the plug seat comprises a fixing seat defining a jack socket, a plurality of pins are disposed on an inner peripheral wall of the jack socket, the contact portion is electronically connected to the pins.

13. The electronic device as claimed in claim 12, further comprising a central processing unit and a battery charge controller, the central processing unit is electronically connected to the plug, the contact portion is electronically connected to the battery charge controller.

14. The electronic device as claimed in claim 12, wherein a free end of the connecting portion defines a receiving groove, and a probe is disposed in the receiving groove for being electronically connected to the power supply terminal.

15. The electronic device as claimed in claim 10, wherein the USB connector comprises a connecting end, main portion, and a shaft; the connecting end and the shaft extend from two ends of the main portion, the shaft is rotatably connected to the switch element.

16. The electronic device as claimed in claim 15, wherein the shaft defines a connecting hole passing therethrough, the switch element defines a notch by forming two ends facing each other, a post extends from each of the ends; each post rotatably matching in the connecting hole.

17. The electronic device as claimed in claim 16, wherein a power supply terminal and a grounding terminal are positioned on an inner peripheral wall of the connecting hole, the earphone assembly further comprises a power wire and a ground wire, the power supply terminal and the grounding terminal are electronically connected to the plug by the power wire and the ground wire.

18. The electronic device as claimed in claim 17, wherein the switch element defining a first through hole, the power wire and a ground wire pass through the first through hole and electronically connect the plug to the power supply terminal and the grounding terminal.

19. The electronic device as claimed in claim 15, wherein the shaft comprises two opposite side ends, a protrusion extends from each of the side ends; the switch element defines a notch by forming two facing ends facing each other, each of the facing ends defines a rotating groove; each protrusion rotatably matching in the rotating groove.

* * * * *